J. DONGES.
COOKER.
APPLICATION FILED NOV. 8, 1920.

1,433,501.

Patented Oct. 24, 1922.
2 SHEETS—SHEET 1.

Jacob Donges
INVENTOR

BY *Victor J. Evans*
ATTORNEY

WITNESS:

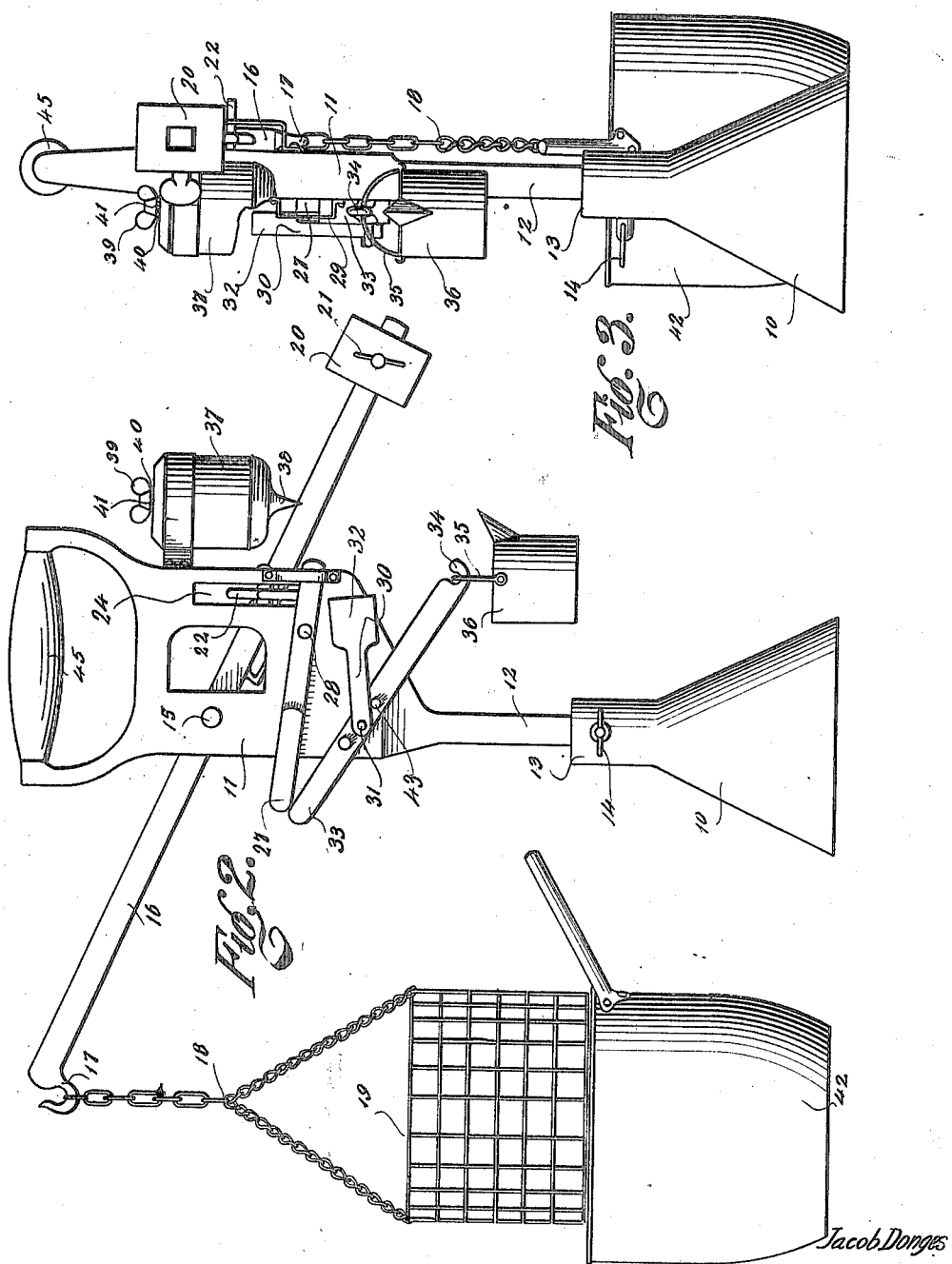

Patented Oct. 24, 1922.

1,433,501

UNITED STATES PATENT OFFICE.

JACOB DONGES, OF DRAYTON, QUEENSLAND, AUSTRALIA.

COOKER.

Application filed November 8, 1920. Serial No. 422,678.

*To all whom it may concern:*

Be it known that I, JACOB DONGES, a subject of the King of Great Britain, residing at Drayton, Toowoomba, Queensland, Australia, have invented new and useful Improvements in Cookers, of which the following is a specification.

This invention relates to improvements in cookers and has for an object the provision of a cooker which is primarily designed for boiling eggs, although it is capable of use for cooking other food, such as boiling potatoes.

Another object is the provision of a cooker of this character, which may be set to boil the eggs for a predetermined period and at the expiration of such period, will be automatically operated to lift the eggs from the water.

Another object is the provision of means for securely locking the parts in operative position, so as to insure the proper control of the cooker, the device being easily and quickly "set" so that the parts will be held against movement for the desired length of time.

A further object is the provision of novel means for releasing the parts at the end of a predetermined period, so that proper cooking of the food is assured.

A still further object is the provision of a device of this character, which is simple in construction and operation and which may be regulated in accordance with the number of eggs which it is desired to boil.

Other objects and advantages of the invention will appear as the following description is read in connection with the accompanying drawings.

In the drawings:

Figure 2 is a similar view showing the parts in the position they assume at the expiration of the cooking period.

Figure 3 is an end view.

Figure 1:
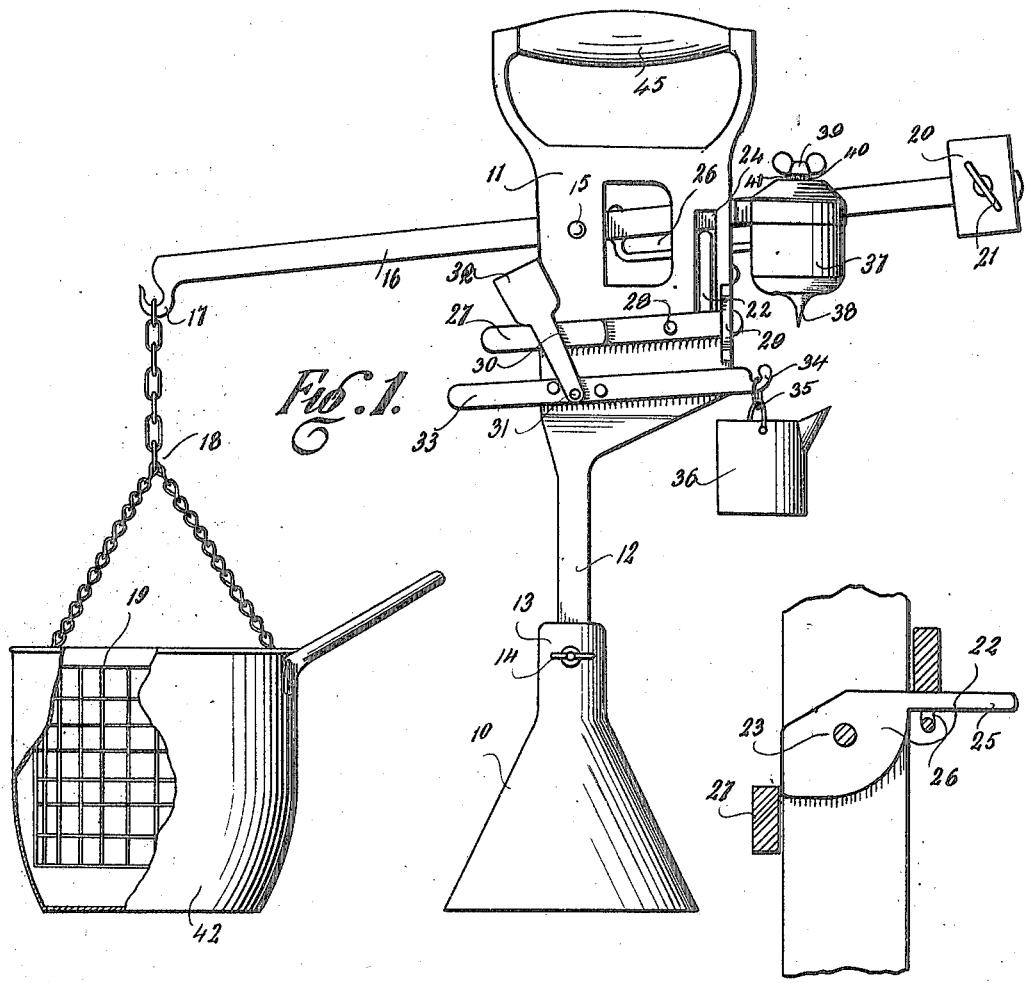
Figure 1 is a view in side elevation of a cooker embodying the present invention, the parts being shown in position for use.
Figure 5:
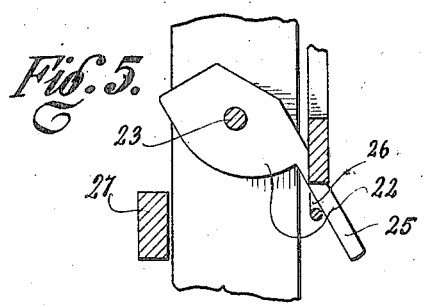
Figure 5 is a view similar to Figure 4 showing the position of the trigger after the latter has been released.

Referring specifically to the drawings, wherein like characters of reference denote corresponding parts, the invention comprises a base 10 and a supporting member 11, the latter being secured to the base through the medium of an arm or standard 12, which enters a socket 13 provided in said base and in which it is adjustably secured through the medium of a set screw 14.

Pivotally mounted upon the supporting member as indicated at 15, is a main balance lever 16. One end of this lever is provided with a hook 17, which is adapted to be engaged by a chain 18, the latter carrying at its lower end a basket or other receptacle 19 which is adapted to contain the eggs or other food to be cooked. The opposite end of the lever 16 has mounted thereon a weight 20, which is adjustable thereon through the medium of a set screw 21. This weight is designed to over-balance the basket 19 and its contents and the weight may be adjusted upon the lever in accordance with the weight of the contents of the basket.

Figure 4:
Figure 4 is an enlarged fragmentary sectional view showing the position of the trigger when "set".

The weight 20 is so adjusted as to just overbalance the weight of the basket and its contents and in order to hold the lever against operation, under the influence of the weight, there is provided a trigger 22. This trigger is pivotally mounted as indicated at 23, in a slot 24 extending transversely of the supporting member 11. One end of this trigger is provided with a finger 25, which enters a slot 26 provided in the lever 16, while the opposite end of the trigger 22 is engaged by one end of a pivotally mounted trip lever 27. The lever 27 is pivoted as indicated at 28 upon the supporting member 11, and one end of this lever operates in a guide 29 and is adapted to bear against the ends of the trigger 22 as indicated in Figures 1 and 4 for the purpose of holding the said trigger against movement. The opposite end of the lever 27 is engaged by a weighted locking arm 30, which is pivotally mounted upon a pin 31 projecting from the supporting member 11. The free end of the locking arm is provided with an offset weight 32, which engages over the outer end of the trip lever 27 and is designed to hold the opposite end of said lever in engagement with the trigger.

Pivotally mounted upon the pin 31 is an operating lever 33, one end of which is provided with a hook 34, which receives the bail 35 of a receptacle 36. This receptacle is located beneath a container 37, which is provided with an outlet spout 38, so that the contents of the container 37 will pass into the receptacle 36. The outlet spout 38 of the container 37 is controlled by a needle valve 39, which carries a pointer 40 and this pointer is designed to cooperate with graduations 41 surrounding the stem of the valve.

In the operation of the invention, the basket is placed within a suitable water filled receptacle 42, which is placed over a suitable source of heat and the pointer is set to the proper place upon the graduations. This will open the needle valve 39, so that when the desired period has elapsed, a sufficient amount of water will have passed from the container 37 into the receptacle 36. This overbalances the operating lever 33 and causes the locking arm to be thrown to the position illustrated in Figure 2. In this position the locking arm contacts with a pin or stud 43, which imparts a sudden upward movement to the free end of the operating lever 33. This end contacts with the adjacent end of the trip lever 27 and releases the opposite end of said lever from engagement with the trigger 32. The main balance lever 16 is then released and the weighted end descends by gravity so as to lift the basket 19 from the receptacle 42.

When this operation occurs, the upward movement of the lever 16 will operate an alarm mechanism, which is carried by the supporting member 11, and for convenience, this supporting member is provided with a handle or grip 45.

The invention is susceptible of various changes in its form, proportions and minor details of construction, and the right is herein reserved to make such changes as properly fall within the scope of the appended claims.

Having described the invention what is claimed is:—

1. A cooker comprising a slotted balance lever, a container secured upon one end thereof, a balance weight mounted upon said lever, a trigger disposed transversely of and engageable with the slot of said lever for holding the latter against movement and liquid controlled means for releasing the trigger at a predetermined period to release the balance lever.

2. A cooker comprising a balance lever, a container secured upon one end thereof, a balance weight mounted upon said lever, a pivoted trigger having one end engageable with said lever for holding the latter against movement, a trip lever engageable with the opposite end of the trigger for preventing operation of the latter, a pivotally mounted operating lever and a weight controlled locking arm carried by the operating lever and engageable with the trip lever for releasing the latter after a predetermined period to release the balance lever.

3. A cooker comprising a balance lever, a container secured to one end thereof, a balance weight mounted upon said lever, a trigger engageable with said lever for holding the latter against movement, an operating lever, a trip lever, a locking arm controlled by the operating lever to operate the trip lever and release the trigger and valve controlled means for controlling the operating arm whereby the balance lever will be released at a predetermined period.

4. A cooker comprising a balance lever, a container secured upon one end thereof, a balance weight mounted upon said lever, a trigger engageable with said lever for holding the latter against movement, a pivotally mounted operating lever, a trip lever, spaced stops carried thereby, a locking arm controlled by the operating lever engageable with one of the stops to cause the operating lever to engage the trip lever and release the trigger, a valve controlled container and a receptacle carried by the operating lever and located beneath the container whereby the contents of the latter will be deposited within the receptacle to release the trigger and permit of the operation of the balance lever at a predetermined period.

In testimony whereof I affix my signature.

JACOB DONGES.